Patented Aug. 9, 1949

2,478,788

UNITED STATES PATENT OFFICE 2,478,788

PROCESS FOR PREPARING AMINO ACIDS

Harold R. Snyder, Urbana, Ill., and Max Tishler, Rahway, N. J., assignors to Merck & Co., Inc., Rahway, N. J., a corporation of New Jersey No Drawing. Application November 10, 1944, Serial No. 562,912

8 Claims. (Cl. 260—471)

This invention relates generally to processes for preparing amino acids, and particularly to a new process for preparing amino acids from substances not previously used as starting materials, and to new substances as intermediates in said process.

Certain amino acids have been prepared by a process wherein phthalimidomalonic ester or benzamidomalonic ester is alkylated and the condensation product is subjected to hydrolysis and decarboxylation. Production of amino acids from these starting materials, however, is unsatisfactory from the standpoint of commercial practicality because the starting materials are difficult to prepare and further because the amino acid produced can only be recovered by intricate extraction steps.

It is now discovered according to the present invention that the synthesis of certain amino acids, particularly those derived from primary alkyl or substituted alkyl compounds, is effected in a highly efficient and practical manner by reacting such compounds with acetamidomalonic esters.

Regarded in certain of its broader aspects the novel process, according to this invention, comprises condensing an acetamidomalonic ester with a compound of the formula $RCH_2X$ wherein X is halogen and R is of the class consisting of hydrogen and monovalent organic radicals, in the presence of sodium alcoholate, and converting the alkylated acetamidomalonic ester thus formed to the amino acid of the formula $RCH_2CHNH_2COOH$ by hydrolysis and decarboxylation.

Hydrolysis in the presence of dilute alkali such as sodium hydroxide, or saponification, of the alkylated acetamidomalonic ester yields the corresponding alkylated acetamidomalonic acid. Decarboxylation of the acid by heating to reflux with dilute mineral acid such as hydrochloric acid for a short period of time, one-half to one hour, yields the acetyl derivative which is converted to the amino acid, formula $$RCH_2CHNH_2COOH$$

by further hydrolysis; whereas decarboxylation by heating to reflux in concentrated mineral acid for a longer period of time, viz. two to six hours, effects both decarboxylation and deacetylation and yields the amino acid directly.

The process of the present invention is applicable to primary alkyl and substituted alkyl halides generally, but has been found unsatisfactory when secondary alkyl halides having the group >CHX are employed as starting materials. Thus in the starting material $RCH_2X$  the monovalent organic radical R can be an alkyl group such as ethyl, propyl and isopropyl; a substituted alkyl group such is an alkyl-thio-alkyl group of the formula $$-CH_2SCH_3$$ 

or $-CH_2CH_2SCH_2CH_2SCH_2CH_2-$, an aryl group such as phenyl, a heterocyclic group such as β-indolyl or β-iminazolyl, and the like.

By the term acetamidomalonic ester as used throughout the specification and claims is meant the diester. It is to be understood further that while the diethyl ester is described in the examples below, the condensation proceeds in like manner with other diesters of acetamidomalonic acid.

Advantages of the process for preparing amino acids according to the present invention reside not only in the fact that acetamidomalonic esters are much more readily and economically prepared than starting material previously suggested, but also in the fact that upon hydrolysis of the condensation product water soluble reaction products are formed which are readily separated from the relatively insoluble amino acids without the necessity of intricate organic solvent extraction.

The following examples illustrate methods of carrying out the present invention but it is to be understood that these examples are given by way of illustration and not of limitation.

Example I

A solution of about 1.15 g. (0.05 atom) of sodium in 75 cc. of absolute ethanol is prepared in a 200 cc. 3-necked round-bottomed flask equipped with mechanical stirrer and reflux condenser protected from atmospheric moisture by a calcium chloride tube. To this is added about 10.85 g. (0.05 mole) of acetamidomalonic ester and then about 6.3 g. (0.05 mole) of benzyl chloride. The yellow solution is stirred under reflux for twelve hours.

The hot reaction mixture is filtered and the precipitate washed with hot absolute ethanol. The combined filtrates are evaporated under diminished pressure on a steam bath and the residue was cooled and washed onto a filter. The product, diethyl benzylacetamidomalonate, after recrystallization from water melts at about 106° C.

Anal. calcd. for $C_{16}H_{21}O_5N$: C, 62.53; H, 6.89. Found: C, 62.73; H, 7.16.

In a 200 cc. round-bottomed flask a mixture of 60 cc. of ten per cent sodium hydroxide solution and 12.7 g. of the crude condensation product is heated under reflux for four hours. The cooled solution is acidified with 50 cc. of 3 N hydrochloric acid and then heated under reflux for one hour. The hot solution is filtered and the filtrate allowed to remain in the ice-box for eighteen hours. The crystalline material is collected on a filter and dried. This product, dl-N-acetyl-phenylalanine, after recrystallization from hot water melts at about 145–146° C.

*Example II*

To about 1.22 g. (0.053 mole) of sodium in 75 cc. of absolute ethanol in a 200 cc. 3-necked, round-bottomed flask with mechanical stirrer, reflux condenser protected from atmospheric moisture by a calcium chloride tube is added about 11.50 g. (0.053 mole) of diethyl acetamidomalonate and about 7.8 g. (0.055 mole) of isobutyl bromide. The clear solution is stirred at reflux temperature for fifteen hours.

The hot reaction mixture is filtered and the solid washed with hot absolute ethanol. The filtrate is evaporated under reduced pressure on a steam bath and the oily residue is caused to crystallize by the addition of 20 cc. of water. The condensation product is collected on a filter. This crude diethyl isobutylacetamidomalonate melts at about 82–83° C.

A mixture of about 10.8 g. of crude diethyl isobutylacetamidomalonate and 25 cc. of twenty per cent sodium hydroxide solution is heated under reflux for three hours, allowed to cool, and then acidified with concentrated hydrochloric acid. This acid solution is then allowed to reflux for thirty minutes. The hot solution is filtered and the filtrate cooled. An oil separates and soon solidifies. This product, dl-N-acetylleucine, melts at about 155–157° C.

*Example III*

To about 1.23 g. of sodium in 75 cc. of absolute ethanol in a 200 cc. 3-necked round-bottomed flask with mechanical stirrer, reflux condenser protected from atmospheric moisture by a calcium chloride tube, and cork stopper is added about 11.5 g. (0.053 mole) of diethyl acetamidomalonate and then about 7.0 g. (0.05 mole) of n-propyl bromide. This solution is heated at reflux temperature with stirring for about ten hours.

The hot mixture is filtered and the solid extracted with hot absolute ethanol. The filtrate is evaporated under diminished pressure on a steam cone and the residue treated with 20 cc. of water. The condensation product is separated by filtration and dried in an evacuated desiccator containing calcium chloride. This product, n-propylacetamidomalonate, melts at about 93–93.5° C.

A mixture of about 7.1 g. (0.027 mole) of diethyl n-propylacetamidomalonate and 25 cc. of twenty per cent sodium hydroxide solution is heated under reflux for two and one-half hours. The cooled saponification mixture is acidified by the addition of 10 cc. of concentrated hydrochloric acid and then heated at reflux temperature for one hour. The hot solution is filtered and the filtrate is allowed to stand in the ice-box for twenty-four hours. Crystallization is aided by scratching with a glass rod. The dl-N-acetylnorvaline is collected on a filter and dried. It melts at about 116–117° C.

*Example IV*

A dry, 200 cc. 3-necked, round-bottomed flask, equipped with grease-sealed mechanical stirrer and a reflux condenser protected by a calcium chloride-soda lime tube is swept out with dry nitrogen. Into the flask are introduced 75 cc. of absolute ethanol and about 1.20 g. (0.052 mole) of sodium. After solution of the sodium is complete, about 11.5 g. (0.053 mole) of diethyl acetamidomalonate, 0.2 g. potassium iodide and about 8.20 g. (0.06 mole) of n-butyl bromide are introduced. Nitrogen is passed through the apparatus at a slow rate continually except for the periods of addition of the reactants. The reaction mixture is heated and stirred under reflux for twelve hours. The hot reaction mixture is filtered and the solid washed with hot absolute ethanol. The filtrate and washings are evaporated under diminished pressure on a steam cone. The residue taken up in water containing a little sodium bisulfite and the solution is saturated with salt and extracted six times with ether. Upon evaporation of the ether a viscous orange-yellow oil is obtained which solidifies in the ice chest but remelts below room temperature.

This oil, diethyl-n-butylacetamidomalonate is refluxed for one hour with 50 cc. of ten per cent aqueous sodium hydroxide. The cooled solution is acidified with 10 cc. of concentrated hydrochloric acid and refluxed for an hour. The hot solution is treated with Norite and filtered. The cooled filtrate on standing twenty-four hours yields a yelowish-white crystaline solid. This product, dl-N-acetylnorleucine, melts at about 104.5–105.5° C.

*Example V*

A solution of about 2.3 g. of sodium in 50 cc. absolute alcohol is added to about 7 g. of ethylene-bis-($\beta$-chlorethyl sulfide) and about 28 g. of ethyl acetamidomalonate in 150 cc. absolute ethanol. This reaction mixture is heated under reflux with stirring for five hours, cooled in an ice bath and filtered. The solid collected is extracted with boiling absolute alcohol, the alcoholic extract is cooled, and the product, the diethyl ester of ethylene-bis-(gamma,gamma-dicarboxy-gamma-acetamido-propyl-sulfide) is separated by filtration. It melts at about 154–155° C.

Analysis calculated for $C_{24}H_{40}O_{10}N_2S_2$: C, 49.64; H, 6.93. Found: C, 49.77; H, 7.08.

To a solution of about 2 g. sodium hydroxide in 25 cc. of water and 25 cc. of ethanol about 4.5 g. of the above ester is added. The mixture is heated under reflux for about two hours and evaporated to dryness under reduced pressure. The residue is dissolved in about 100 cc. of concentrated hydrochloric acid, heated under reflux for about three hours and concentrated to dryness under reduced pressure. The residue is extracted three times with boiling ethanol, decolorized with charcoal, and an excess of pyridine is added. Upon standing in a refrigerator overnight crude omega, omega'-bimethionine separates. After recrystallization from water the product melts at about 285–288° C.

Analysis calculated for $C_{10}H_{20}O_4N_2S_2$: C, 40.5; H, 6.75; N, 9.45. Found: C, 40.5, H, 7.05; N, 9.12.

Modifications may be made in carrying out the present invention without departing from the spirit and scope thereof and the invention is to be limited only by the appended claims.

What is claimed is:

1. The process for preparing amino acids that comprises condensing an acetamidomalonic ester in the presence of sodium alcoholate with a compound of the class consisting of primary alkyl halides, benzyl halides, and ethylene-bis-($\beta$-haloethyl sulfide), heating the substituted acetamidomalonic ester thus formed in dilute alkali to effect hydrolysis of the ester groups, heating the resulting acetamidomalonic acid in the presence of a mineral acid to effect removal of one carboxyl group and the N-acetyl group, and recovering the corresponding amino acid.

2. The process that comprises condensing an acetamidomalonic ester with benzyl chloride in the presence of sodium alcoholate, heating the benzyl-acetamidomalonic ester thus formed in dilute alkali to effect hydrolysis of the ester groups, heating the resulting benzyl-acetamidomalonic acid in the presence of a mineral acid to effect removal of one carboxyl group and the N-acetyl group, and recovering dl-phenyl alanine.

3. The process that comprises condensing an acetamidomalonic ester with isobutyl bromide in the presence of sodium alcoholate, heating the isobutyl-acetamidomalonic ester thus formed in dilute alkali to effect hydrolysis of the ester groups, heating the resulting isobutyl-acetamidomalonic acid in the presence of a mineral acid to effect removal of one carboxyl group and the N-acetyl group, and recovering dl-leucine.

4. The process that comprises condensing an acetamidomalonic ester with n-propyl bromide in the presence of sodium alcoholate, heating the n-propyl-acetamidomalonic ester thus formed in dilute alkali to effect hydrolysis of the ester groups, heating the resulting n-propyl-acetamidomalonic acid in the presence of a mineral acid to effect removal of one carboxyl group and the N-acetyl group, and recovering dl-norvaline.

5. The process that comprises condensing an acetamidomalonic ester in the presence of sodium alcoholate with a compound of the class consisting of primary alkyl halides, benzyl halides, and ethylene-bis-(β-haloethyl sulfide), and recovering the corresponding substituted acetamidomalonic ester.

6. The process that comprises condensing an acetamidomalonic ester in the presence of sodium alcoholate with benzyl chloride, and recovering the corresponding benzyl acetamidomalonic ester.

7. The process that comprises condensing an acetamidomalonic ester in the presence of sodium alcoholate with isobutyl bromide, and recovering the corresponding isobutyl acetamidomalonic ester.

8. The process that comprises condensing an acetamidomalonic ester in the presence of sodium alcoholate with n-propyl bromide, and recovering the corresponding n-propyl acetamidomalonic ester.

HAROLD R. SNYDER.
MAX TISHLER.

REFERENCES CITED

The following references are of record in the file of this patent:

UNITED STATES PATENTS

| Number | Name | Date |
| --- | --- | --- |
| 2,135,641 | Jacobson | Nov. 8, 1938 |
| 2,179,979 | Isler | Nov. 14, 1939 |
| 2,203,009 | Calcott et al. | June 4, 1940 |
| 2,420,641 | Albertson et al. | May 20, 1947 |

OTHER REFERENCES

Cherchez & Locquin, "Bull. Soc. Chim." (Paris), series 4, vol. 43 (1928), p. 932.

Abderhalden et al., Beilstein (4th ed.), 1st Suppl. (1929), vol. 4, pp. 515–516.

Locquin & Cherchez, "Bull. Soc. Chim." (Paris), series 4, vol. 47 (1930), pp. 1379–1388.

Leuchs et al., Beilstein (4th ed.) (1931), vol. 14, p. 501.

Karrer et al., "Helv. Chim. Acta," vol. 18 (1935), pp. 783–788.

Redeman et al., "J. Biol. Chem.," vol. 130 (1939), pp. 342–346.

Painter, "Jour. Am. Chem. Soc.," vol. 62 (1940), p. 232.

Abderhalden et al., Beilstein (4th ed.), 2nd Suppl. (1942), vol. 4, p. 843.

Kimura, Beilstein (4th ed.), 2nd Suppl. (1942), vol. 4, p. 877.

Locquin et al., Beilstein (4th ed.) 2nd Suppl., vol. 4, 1942, p. 914.

Snyder et al., "J. Am. Chem. Soc.," vol. 65 (Nov. 1943), pp. 2211–2214.

Snyder et al., "J. Am. Chem. Soc.," vol. 66, March 9, 1944, pp. 350–351.

Dakin, "J. Biol. Chem.," vol. 144, Aug. 1944, pp. 552–554.